April 2, 1963     J. C. BARBER ETAL     3,084,029
RECOVERY OF PHOSPHORUS FROM SLUDGE

3,084,029
RECOVERY OF PHOSPHORUS FROM SLUDGE
James C. Barber, George H. Megar, and Thomas S. Sloan, Florence, Ala., assignors to Tennessee Valley Authority, a corporation of the United States
Filed June 19, 1961, Ser. No. 118,204
3 Claims. (Cl. 23—223)
(Granted under Title 35, U.S. Code (1952), sec. 266)

The invention herein described may be manufactured and used by or for the Government for governmental purposes without the payment to us of any royalty therefor.

Our invention relates to an improvement in the production and recovery of phosphorus, and more particularly to an improved process for treating phosphorus sludge formed during the production of phosphorus by smelting phosphate rock.

Heretofore it has been the practice in the chemical industry to produce elemental phosphorus from phosphate rock by reducing the phosphate rock with coke or other carbonaceous reducing agents in the presence of silica. Such a process is normally carried out in equipment such as an electric phosphorus smelting furnace in which the phosphorus vapor therefrom carries with it such foreign matter as particles of rock, sand, reducing agent, and fluorine compounds. The result of such process is that when the phosphorus vapor is condensed and collected under water in order to recover the phosphorus some of the product upon removal from the condenser is found to be of the character of a sludge containing various concentrations of phosphorus as well as the above-mentioned impurities and water.

It has been the practice to install electrostatic precipitators at the phosphorus furnaces for the purpose of removing the above-mentioned solid impurities from the gases prior to the condensation of phosphorus. However, the precipitators have been found to remove only about 60 to 90 percent of the solids in the gas. The gases are then cooled with water spray to condense the phosphorus vapor to liquid phosphorus. The solid impurities that remain in the gas after passing through the electrostatic precipitators are also collected in the water-phosphorus mixture that drains from the condenser. In the condenser sump (vessel into which the condenser is drained) a layer of relatively high-grade phosphorus is obtained at the bottom; above this layer is a mixture referred to as "sludge" which consists of phosphorus droplets or globules, solid impurities, and water; and above the second layer is a water layer containing phosphorus droplets and solids in suspension. The boundary between the sludge and the water suspension is not clearly defined.

The sludge is viscous and sometimes sticky; it consolidates during storage and becomes more viscous. It is very difficult to pump and burn consolidated sludge in conventional burner assemblies. Also, the acid produced by burning the sludge is contaminated.

Various methods of preparation and recovery of the phosphorus from the sludge have been suggested in the prior art; among these are filtration, distillation, and briquetting methods.

Phosphorus in the sludge can be separated from its impurities by distillation, but this method of separation has several disadvantages when practiced on a commercial scale. Phosphorus losses are high as a result of the formation of red phosphorus which remains in the residue, and some phosphorus is lost as uncondensed vapor. Also, investment costs for a distillation assembly are high.

Our invention is directed to an improved process for recovering phosphorus from sludge by means utilizing the introduction of small amounts of dispersing agents into the sludge to be treated. We have discovered that the use of as little as 1.5 parts of our dispersing agent per 1,000 parts by weight of sludge substantially reduces the stickiness of the sludge, and the viscosity of the treated sludge is reduced so as to result in a material which is sufficiently fluid as to be readily pumped to and burned in conventional phosphorus burners to recover, as $P_2O_5$, the phosphorus values from said sludge.

We have found that the use of our dispersing agent increased the pH of the sludge from a value of about 3.0 up to a value of about 6.0, and that the amount of dispersing agent used is highly critical in that excessive use thereof causes the pH of the slurry to rise to above 7.0 with the resulting formation of phosphine gas.

It is therefore an object of the present invention to provide an improved method of treating phosphorus sludge by a process in which substantially all of the elemental or uncombined phosphorus contained in the sludge can be removed in a simple and economical manner.

Still another object of the present invention is to provide a method of treating the phosphorus sludge whereby a substantial part of any combined phosphorus contained in the sludge can be recovered as $P_2O_5$.

A further object of the present invention is to provide an improved method for recovering phosphorus from sludge in which the sludge is consolidated and is treated with a small but critical amount of dispersant to reduce its viscosity and make it readily pumpable to ensure ease in burning same to recover therefrom the phosphorus values.

A still further object of the present invention is to provide an improved method for recovering phosphorus from sludge in which the sludge is consolidated and is treated with a small but critical amount of dispersant to reduce its viscosity and make it readily pumpable, and in which the cost of treating the sludge with dispersant is in the range of about 30 cents to 60 cents per ton.

A still further object of the present invention is to provide an improved method for recovering phosphorus from sludge in which the sludge is consolidated and is treated with a small but critical amount of dispersant to reduce its viscosity and make it readily pumpable, in which the cost of treating the sludge with dispersant is in the range of about 30 cents to 60 cents per ton, and in which substantially larger amounts of low-cost reducing agents (bituminous coal) may be used in the phosphorus smelting furnaces.

Another object of the present invention is to provide an improved method for the recovery of phosphorus from sludge in which method the phosphorus particles in the sludge are caused to coalesce by means of applied centrifugal force with the resulting recovery of elemental phosphorus therefrom.

Still another object of the present invention is to provide an improved method for the recovery of phosphorus from sludge in which method the phosphorus particles in the sludge are caused to coalesce by means of applied centrifugal force with the resulting recovery of elemental phosphorus therefrom, and in which the impurities removed from the sludge may be utilized as a binder to agglomerate furnace feed materials.

In carrying out the objects of the present invention in one form thereof, we employ a method of effectively decreasing both the viscosity and the stickiness of the sludge through the use of an extremely small amount of effective dispersing agent selected from a group of commercially available lignosulfonates. In addition, we have also discovered that the use of sodium hydroxide as the dispersing agent provides results which indicate that it is almost as effective as the lignosulfonate agents, and that, furthermore, the use of such sodium hydroxide material as a dispersing agent may prove to be somewhat more economical than the use of a lignosulfonate dispersant.

Our invention, together with further objects and advantages thereof, will be better understood from consideration of the following description, taken in connection with the accompanying drawings, in which.

Figure 1:
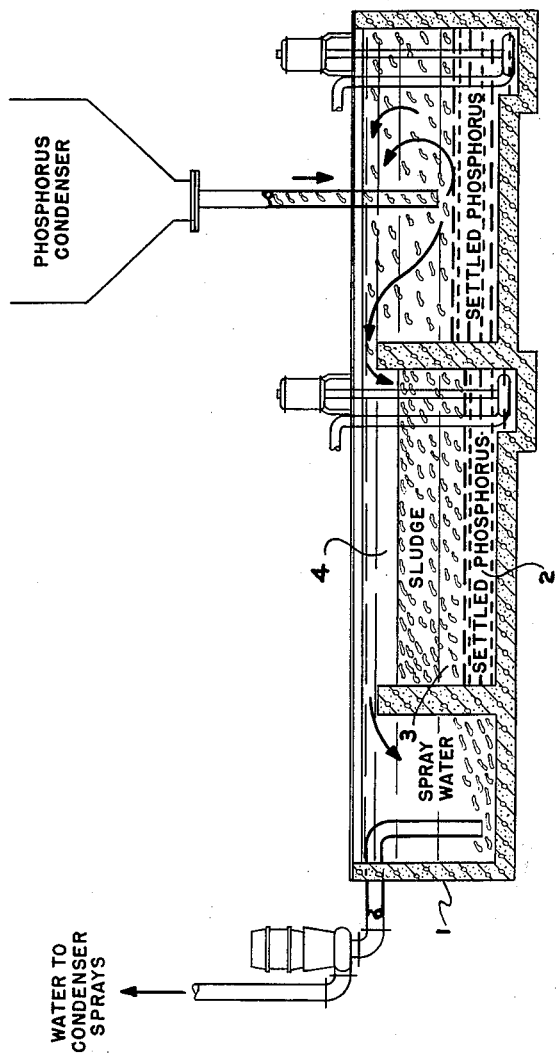
FIGURE 1 is a diagrammatical illustration of a phosphorus condenser sump showing how the phosphorus-sludge and the water-suspension layers are collected in the sump.

Referring now more specifically to FIGURE 1, there is shown a condenser sump 1 in which a layer of relatively high-grade phosphorus is obtained as bottom layer 2. Above bottom layer 2 is shown a layer of the sludge 3 which consists of phosphorus droplets or globules, solid impurities, and water. Above layer 3 is shown water layer 4 containing phosphorus droplets and solids in suspension.

Microscopic examination of the sludge shows that it consists of globular particles of yellow phosphorus, 1 to 2 millimeters in diameter down to a few microns in size. Fine particulate foreign matter is associated with the phosphorus. There is little tendency for the phosphorus particles to coalesce; however, some of the smaller globules agglomerate into clusters. Electrical charges and physical barriers of foreign solids are thought to retard or prevent coalescence of this phosphorus.

The solids in the sludge result from the precipitation of solids in the condensing system and particles in the furnace charge being carried over into the condensing system. Following is the approximate composition of the solid fractions of the sludge: 32 percent $P_2O_5$, 23 percent F, 8 percent CaO, and 7 percent $SiO_2$. The amounts of $P_2O_5$ and F in the sludge in one system were found to be about 2.1 and 1.6 tons per day, respectively.

When bituminous coal is used as a reducing agent in the phosphorus furnaces, some of the carbonaceous material in the coal is volatilized and carried over to the condenser. The carbonaceous material collects in the sludge layer and causes the sludge to be sticky and more difficult to handle. Bituminous coal is much less costly than coke (which is normally used as the reducing agent); however, the amount of coal that can be used is limited because of the adverse effect on the sludge properties. We have found that the amount of low-volatile bituminous coal used in the furnaces is limited to about half of the total reducing agent requirement because of the adverse effect of the carbonaceous material on the handling properties of the sludge. The development of our method to cope with the sludge problem results in greater economies in the smelting furnaces by allowing the use of larger amounts of bituminous coal or the use of lower cost (high volatile-matter content) coal.

The sludge collected in condenser sump 1 may be pumped to an acid unit and burned, or the material may be pumped to storage tanks for later use in the production of phosphoric acid. When the sludge is burned shortly after its collection, some of the impurities enter the acid and cause it to be contaminated. This problem is of greater concern when bituminous coal is used in the furnaces, because the carbonaceous material is not completely burned and carbon sometimes collects in the acid. In addition, fluorine is evolved when the sludge is burned, and the fluorine causes serious corrosion problems in the acid unit.

On the other hand, if the sludge is stored for a time before it is burned, some of the phosphorus slowly collects as a liquid layer in the bottom of the sump, as is shown in FIGURE 1; consequently, the phosphorus content in the sludge layer decreases. Upon prolonged storage the sludge layer consolidates and becomes extremely viscous. The phosphorus content decreases so much that it may be difficult or impossible to burn the material in an acid unit. The presence of carbonaceous material causes the sludge to be sticky and further complicates its pumping, mixing, and burning.

Figure 2:
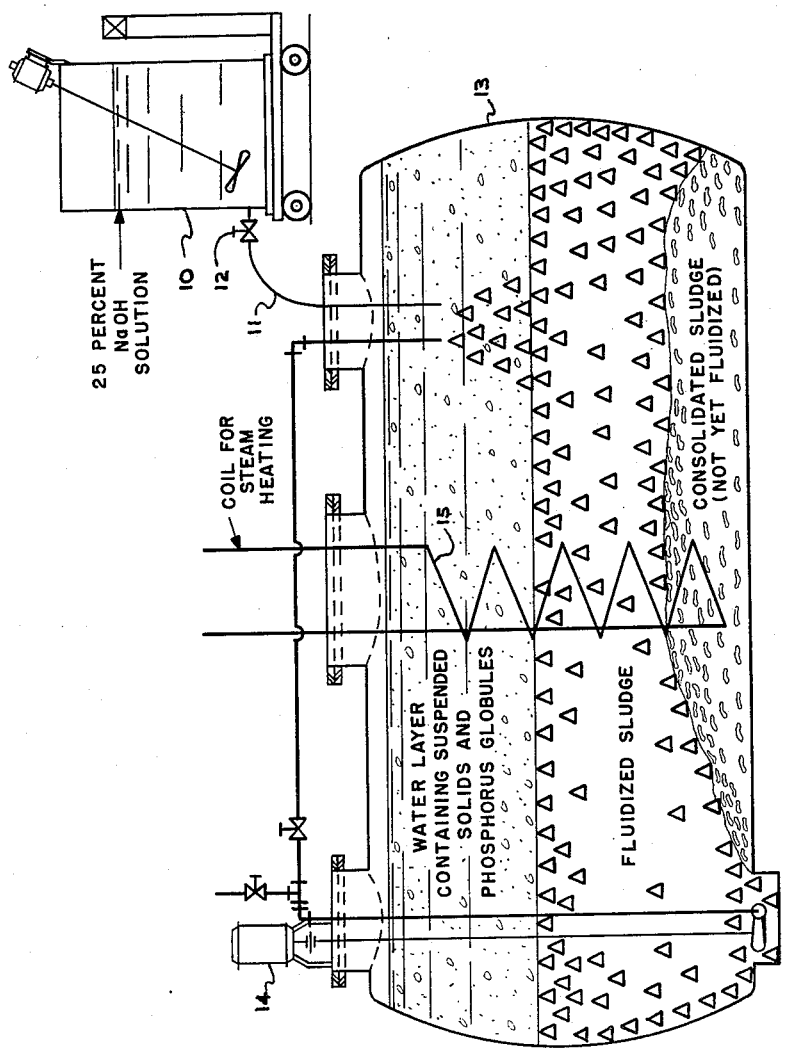
FIGURE 2 is a diagrammatical illustration of the prefered embodiment of the present arrangement for fluidizing sludge with our dispersing agent.

Referring now more specifically to FIGURE 2, sodium hydroxide solution is fed through line 11 and means for control 12 into storage tank 13. Mixing of the contents of tank 13 is effected by recirculation with pump 14. It has been found that the contents of tank 13 can be mixed by recirculation with pump 14 in a convenient manner; however, mixing can also be accomplished, perhaps more quickly, by the use of a mechanical agitator, not shown. Internal steam coils 15 are used as a means for heating the contents in tank 13. The sodium hydroxide solution dispersing agent is added slowly over a period of about 2 hours until the pH of the sludge in the tank increases to about 6.0. The sludge is then further mixed for approximately an additional 5 or 6 days, and then may be stored for an additional period of time prior to burning in a phosphoric acid unit.

Figure 3:
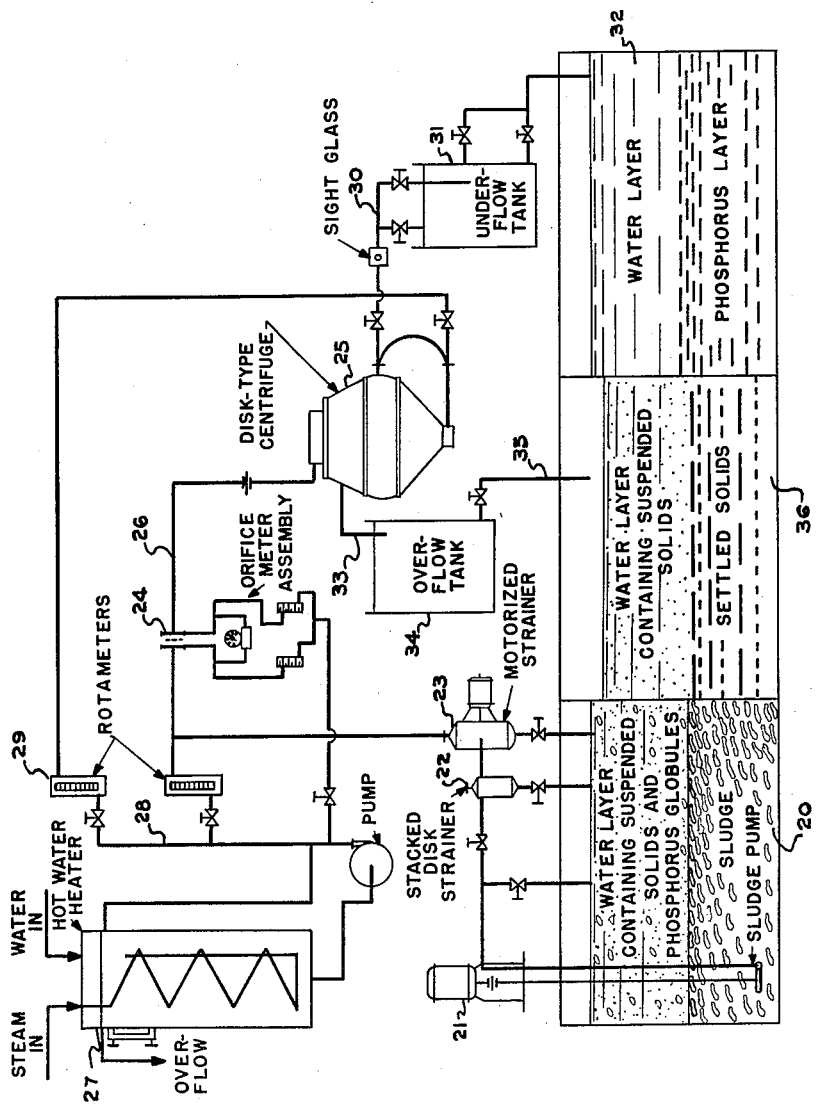
FIGURE 3 is a diagrammatical illustration showing an alternative method of recovering phosphorus by means of centrifuging the sludge to cause coalescence of the phosphorus particles therein and to permit recovery of elemental phosphorus as a high-grade material.

Referring now more specifically to FIGURE 3, there is shown an alternative method of coalescing phosphorus globules in the sludge and separating liquid phosphorus from its impurities by centrifugal means. Sludge in compartment 20 is pumped by means 21 through strainers 22 and 23 through sludge meter 24, and into disk-type centrifuge 25 via line 26. Hot water from water heater 27 is led through line 28, through meter 29, and introduced into centrifuge 25. Underflow from centrifuge 25 is fed via line 30 into underflow tank 31 and then to storage tank 32. The underflow is a liquid material containing more than about 90 percent phosphorus. Overflow is fed by line 33 into overflow tank 34 and then by line 35 into settling tank 36. The overflow is a slurry containing solid impurities and carbonaceous material originally present in the sludge. The phosphorus content of the overflow material is usually less than about 3 percent. The phosphorus recovered in the underflow and collected as a layer in storage tank 32 is suitable for use in any subsequent fertilizer process.

In order that those skilled in the art may better understand how the present invention can be practiced, the following examples are given by way of illustration and not by way of limitation.

EXAMPLE I

Phosphorus was produced in an electric furnace from a mixture of phosphate rock, coke, and silica. Impure phosphorus collected in the condenser sump was pumped to storage tanks. Phosphorus settled out of the impure phosphorus mixture and was pumped off, leaving a consolidated viscous sludge. The sludge in the different storage tanks contained various phosphorus contents and viscosities depending on the storage time and the amount of phosphorus that had settled out. The viscosity was as great as 15,000 centipoises, and the phosphorus content was as low as 7 percent. One storage tank contained 52 tons of consolidated sludge which had a viscosity of 3,400 centipoises and a pH value of 3, but the sludge was not sticky. Phosphorus content of the sludge was 69 percent at the bottom, 44 percent in the middle, and 14 percent at the top of the sludge layer. Piping was installed in the tank to permit mixing by recirculation of the contents from one end of the tank to the other, as is shown in FIGURE 2. The mixing of the contents of the tank by recirculation with a pump was a convenient mixing method, but perhaps the mixing could have been accomplished much more quickly by use of a mechanical agitator. The contents of the tank were heated by means of internal steam coils to a temperature of 140° F. A 25 percent sodium hydroxide solution was added slowly (a total of 150 pounds of NaOH was added over a period of about 2 hours), after which the pH of the sludge was found to have increased to about 6.0. Excesses of NaOH (pH values above 7.0) would cause hazardous phosphine gas to form. The sludge was mixed 72 hours by pumping from one end of the tank to the other, after which time analysis showed relatively uniform phosphorus content. After storage for 3 days, the sludge was burned in a phosphoric acid unit to produce superphosphoric acid. Data on the acid-plant operation are given in Table 1.

Table 1
OPERATING DATA FOR ACID UNIT WHILE BURNING FLUIDIZED SLUDGE

| | |
|---|---|
| Duration of test, hours | 6 |
| Sludge burning rate, pounds per hour | [1] 4,545 |
| Excess air, percent | 18.0 |
| Combustion chamber outlet temperature, °F. | 1,163 |
| Venturi scrubber inlet temperature, °F. | 192 |
| Composition of acid produced, percent: | |
| $H_3PO_4$ | 106.1 |
| $P_2O_3$ | 0.4 |
| Suspended solids | 0.2 |
| C | 0.016 |
| F | 0.010 |
| Composition of exhaust gas, percent by volume: | |
| $CO_2$ | 0.7 |
| $O_2$ | 3.8 |
| $N_2$ | 95.5 |

[1] Equivalent to a phosphorus burning rate of 2,500 pounds per hour.

EXAMPLE II

Phosphorus was produced in an electric furnace by the reduction of phosphate rock with a mixture of coke and medium-volatile bituminous coal as reducing agent, and silica as a flux. Phosphorus collected in the condenser sump (as is shown in FIGURE 1) as a yellow liquid layer in the bottom of the sump. A sludge layer was found on top of the liquid phosphorus layer. The sludge contained carbonaceous material that resulted from the use of bituminous coal as a reducing agent in the furnace; consequently, the sludge was a sticky, viscous material. The sludge was pumped to the storage tank and, in the storage tank, consolidated to form a sticky, viscous, black mass which was very difficult to pump and which would not mix with phosphorus. The stickiness of the sludge was measured by inserting a glass rod 2½ inches into the material and weighing the amount of material adhering to the glass rod. Such a measurement showed that 2.8 grams of material stuck to the rod at a temperature of 150° F. The stickiness of the sludge prevented an accurate measurement of the viscosity in the usual manner, the sludge being somewhat more viscous than material that had no carbonaceous content. The phosphorus content of the sludge was 34 percent near the bottom of the layer and 31 percent near the top. The pH was 2.6. A 25 percent sodium hydroxide solution was added to the sludge, and the contents of the tank were mixed as indicated in FIGURE 2. About 180 pounds of NaOH was added to about 30 tons of sludge in the tank. The stickiness of the sludge, as measured by the glass-rod method, was zero after NaOH addition and mixing. The material was sufficiently fluid to be readily pumped and burned.

EXAMPLE III

The following example follows the alternative embodiment of the present invention, employing the use of centrifuging apparatus. Phosphorus was produced in an electric furnace by the reduction of phosphate rock with a mixture of coke and low-volatile bituminous coal. Phosphorus in the sludge was present as globules mixed with solid particles, carbonaceous material, and water. The phosphorus content of the sludge was 38 percent. The sludge was centrifuged in the assembly as shown in FIGURE 3. This assembly consisted of strainers, a sludge meter, disk-type centrifuge, hot water heater, and necessary pipes and pumps. The sludge feed rate was 3.5 gallons per minute, and hot water (190° F.) was added to the sludge at a rate of 1.5 gallons per minute. The mixture of sludge and hot water flowed through strainers having openings equivalent to 40 mesh. Additional hot water (0.5 gallon per minute) was used as wash water in the centrifuge. The centrifuge operated so as to impart a centrifugal force of 5,200 times gravity to the sludge-water mixture. The centrifugal force caused the phosphorus globules in the sludge emulsion to coalesce to liquid phosphorus having a greater density than the impurities in the sludge, and be discharged as underflow from the centrifuge. Underflow rate was 1.2 gallons per minute, and the overflow rate was 4.3 gallons per minute. Underflow contained 92 percent phosphorus (93 percent of the total phosphorus in the feed). Phosphorus content of the overflow was 2.7 percent (7 percent of the total phosphorus in feed). Phosphorus recovered in the underflow was suitable for use in any of the fertilizer processes. Overflow was a slurry containing the solid impurities and carbonaceous material originally in the sludge. The settled solids obtained as overflow from the centrifuge were used as an experimental binder to agglomerate a mixture of calcined phosphate, coke, and silica. (Mixture consisted of 69.8 percent minus 8-mesh nodule fines, 9.2 percent minus ¼-inch plus 8-mesh coke, and 11.0 percent building sand.) When 10 percent of the solids-carbonaceous material mixture was added to the phosphate-coke-silica mixture and briquetted at a pressure of 5,000 pounds per square inch, cylindrical briquets 1½ inches in diameter, which had a crushing strength of 120 pounds, were formed in a laboratory press. After heating the briquets in an atmosphere of $CO_2$ at 1050° F., the strength of the briquets was 820 pounds. Thus, we have discovered that the sticky carbonaceous material in the sludge resulting from the use of bituminous coal as a reducing agent in phosphorus furnaces may be recovered by centrifuging, and this impurity may be utilized as a binder for agglomerating phosphorus-furnace charge. Or, the impurities in the sludge may be returned to the raw-material process, the carbonaceous material burned out, and the $P_2O_5$ value recovered as feed for the phosphorus furnaces.

EXAMPLE IV

Aqueous effluent from the phosphorus condensers containing solids and globules of phosphorus was fed to the centrifuge assembly shown in FIGURE 3 at a rate of 7.8 gallons per minute. Wash water was added at a rate of 2.0 gallons per minute. Centrifuging of this effluent in a manner similar to that described in Example III caused the suspended phosphorus particles to coalesce to liquid phosphorus. The centrifuging forces developed by the centrifuge caused almost complete coalescence of the phosphorus particles and resulted in the recovery of 99.9 percent of the phosphorus in the centrifuge feed. The recovered phosphorus collected as underflow from the centrifuge contained 64 percent phosphorus, dry basis.

EXAMPLE V

Consolidated sludge was treated with a dispersing agent to decrease viscosity and stickiness according to Example I above. The treated sludge was then centrifuged to recover the phosphorus in accordance with the process shown in Example III above. Treatment with the dispersant permitted the sludge to be more readily pumped and handled. Such a treatment with dispersant facilitates the centrifuging operation, and particularly facilitates the straining of the sludge prior to centrifuging.

While we have shown and described particular embodiments of our invention, modifications and variations thereof will occur to those skilled in the art. We wish it to be understood, therefore, that the appended claims are intended to cover such modifications and variations which are within the true scope and spirit of our invention.

What we claim as new and desire to secure by Letters Patent of the United States is:

1. In the method of producing phosphorus by smelting phosphate rock with a reducing agent in the presence of silica and thereafter condensing, collecting, and recovering the resulting phosphorus vapor under water and separating the accumulated phosphorus-bearing sludge from the relatively pure elemental phosphorus resulting from the condensation of the phosphorus vapor, the improvement which comprises introducing into a vessel said accumulated phosphorus-bearing sludge; applying centrifugal forces to said sludge in said vessel; removing from said vessel as overflow a water slurry containing solids and carbonaceous materials; and recovering from said vessel as underflow liquid phosphorus.

2. In the method of producing phosphorus by smelting phosphate rock with a reducing agent in the presence of silica and thereafter condensing, collecting, and recovering the resulting phosphorus vapor under water, and separating the accumulated phosphorus-bearing sludge from the relatively pure elemental phosphorus resulting from the condensation of the phosphorus vapor, the improvement which comprises introducing into a vessel said accumulated phosphorus-bearing sludge; applying centrifugal forces to said sludge in said vessel; removing from said vessel as overflow containing less than about 7 percent phosphorus by weight a water slurry containing solid and carbonaceous materials; and recovering from said vessel liquid underflow containing more than about 93 percent phosphorus by weight.

3. In the method of producing phosphorus by smelting phosphate rock with a reducing agent in the presence of silica and thereafter condensing, collecting, and recovering the resulting phosphorus vapor under water, separating the accumulated phosphorus-bearing sludge from the relatively pure elemental phosphorus resulting from the condensation of the phosphorus vapor, and collecting an aqueous effluent containing solids and granules of phosphorus from the phosphorus condenser, the improvement which comprises introducing said aqueous effluent into a vessel; applying centrifugal forces to said effluent in said vessel; removing from said vessel as overflow containing less than about 0.05 percent phosphorus by weight (0.1 percent, dry basis) an aqueous slurry containing solids and carbonaceous materials; recovering from said vessel liquid underflow containing from about 20 to 26 percent phosphorus by weight (60 to 75 percent, dry basis); recycling said underflow to said vessel; removing from said vessel as second overflow containing less than about 7 percent phosphorus by weight a water slurry containing solids and carbonaceous materials; and recovering from said vessel a second liquid underflow containing more than about 93 percent phosphorus by weight.

References Cited in the file of this patent
UNITED STATES PATENTS

| | | |
|---|---|---|
| 417,943 | Readman | Dec. 24, 1889 |
| 452,821 | Wing | May 26, 1891 |
| 1,334,474 | Waggaman | Mar. 23, 1920 |